US010795655B1

(12) United States Patent
Verma

(10) Patent No.: US 10,795,655 B1
(45) Date of Patent: Oct. 6, 2020

(54) PROVISIONING OF SOFTWARE APPLICATIONS ON EDGE DEVICES IN AN INTERNET-OF-THINGS ENVIRONMENT

(71) Applicant: SIEMENS AKTIENGESELLSCHAFT, Munich (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/650,111

(22) PCT Filed: Sep. 19, 2018

(86) PCT No.: PCT/EP2018/075346
§ 371 (c)(1),
(2) Date: Mar. 24, 2020

(87) PCT Pub. No.: WO2019/063383
PCT Pub. Date: Apr. 4, 2019

(30) Foreign Application Priority Data

Sep. 27, 2017  (EP) .................................... 17193359

(51) Int. Cl.
*G06F 8/60* (2018.01)
*G06F 9/455* (2018.01)
*H04L 29/08* (2006.01)

(52) U.S. Cl.
CPC ............... *G06F 8/60* (2013.01); *G06F 9/455* (2013.01); *H04L 67/12* (2013.01); *H04L 67/288* (2013.01); *H04L 67/289* (2013.01); *H04L 67/34* (2013.01)

(58) Field of Classification Search
CPC ..... G06F 8/60–66; G06F 9/455; H04L 67/12; H04L 67/288; H04L 67/289; H04L 67/34
(Continued)

(56) References Cited

U.S. PATENT DOCUMENTS

2013/0185048 A1* 7/2013 Morelli, Jr. ........... G06F 9/5077
  703/27
2016/0140025 A1* 5/2016 Enright ............... G06F 11/3684
  717/128
(Continued)

OTHER PUBLICATIONS

Vögler, M., et al., LEONORE—Large-Scale Provisioning of Resource-Constrained IoT Deployments, 2015 IEEE Symposium on Service-Oriented System Engineering, Mar. 30-Apr. 3, 2015, pp. 78-87, [retrieved on Aug. 20, 2020], Retrieved from the Internet: <URL:http://ieeexplore.ieee.org/>.*

(Continued)

*Primary Examiner* — Geoffrey R St Leger
(74) *Attorney, Agent, or Firm* — Lempia Summerfield Katz LLC

(57) ABSTRACT

A method and system is provided for provisioning software applications on edge devices in an Internet-of-Things (IoT) environment. In an embodiment, a method includes generating a plurality of simulation instances capable of simulating behavior of a software application on one or more edge devices in the IoT environment. Each simulation instance is configured with a unique resource configuration. The method includes processing the software application on each simulation instance using data from a plant. Furthermore, the method includes computing an optimum resource configuration associated with the software application based on processing of the software application on the simulation instances. The optimum resource configuration associated with the software application is computed by determining at least one simulation instance from the plurality of simulation instances on which the behavior of the software application is satisfactory, and determining the unique resource configuration associated with the determined simulation instance.

15 Claims, 4 Drawing Sheets

(58) Field of Classification Search
USPC .......................... 717/134, 135, 138, 168–178
See application file for complete search history.

(56) References Cited

U.S. PATENT DOCUMENTS

| | | | |
|---|---|---|---|
| 2016/0162307 A1* | 6/2016 | Muttik | G06F 8/60 |
| | | | 703/27 |
| 2016/0232366 A1 | 8/2016 | Van Gorp | |
| 2016/0258845 A1* | 9/2016 | Mankovskii | H04L 67/18 |
| 2017/0123812 A1* | 5/2017 | Voigt | G06F 8/63 |
| 2018/0063250 A1* | 3/2018 | Justin | H04L 67/125 |
| 2020/0065123 A1* | 2/2020 | Yang | G06F 9/455 |

OTHER PUBLICATIONS

Renner, T., et al., Towards Container-Based Resource Management for the Internet of Things, 2016 International Conference on Software Networking (ICSN), May 23-26, 2016, 5 pages, [retrieved on Aug. 20, 2020], Retrieved from the Internet: <URL:http://ieeexplore.ieee.org/>.*
International Search Report and the Written Opinion for International Patent Application PCT/EP2018/075346 dated Nov. 23, 2018.

* cited by examiner

US 10,795,655 B1

PROVISIONING OF SOFTWARE APPLICATIONS ON EDGE DEVICES IN AN INTERNET-OF-THINGS ENVIRONMENT

The present patent document is a § 371 nationalization of PCT Application Serial No. PCT/EP2018/075346, filed Sep. 19, 2018, designating the United States, which is hereby incorporated by reference, and this patent document also claims the benefit of European Patent Application No. 17193359.1, filed Sep. 27, 2017, which is also hereby incorporated by reference.

TECHNICAL FIELD

The present disclosure generally relates to the field of Internet-of-Things (IoT), and more particularly relates to a method and system for provisioning software applications on edge devices in an IoT environment.

BACKGROUND

In an IoT environment, such as Industrial IoT (IIoT) environment, a plurality of edge devices is connected to an IoT cloud platform and sensors and actuators via the Internet. The edge devices may be light weight, low cost devices which collect data from various sensors and actuators deployed in a plant, store and buffer the collected data, conduct analysis of the collected data, and perform an action (e.g., issuing a control command) based on the outcome of analysis. The edge devices may also be configured to aggregate, filter, selectively report, compress, encrypt, and/or otherwise pre-process the plant data, resulting in less data and/or value-added data being communicated to the IoT cloud platform. This may lead to consumption of less network communication and backend storage and processing resources than may have been required or consumed absent such pre-processing. Each of the edge devices may perform the above functions using one or more software applications deployed therein. The IoT cloud platform is responsible for managing the edge devices, managing the data (e.g., raw or pre-processed) received from the edge devices, and provisioning software applications on the edge devices.

The edge devices in the IoT environment may be resource constrained devices. Further, each of the resource constrained devices may vary in terms of hardware specification and may have different real-time resource capabilities for executing new software applications provisioned by the IoT cloud platform. For example, the edge device which runs on Raspberry Pi™ may be capable of executing different software applications than the edge device based on an industrial PC. Also, the real-time resource capabilities may vary based on number of software applications deployed on the edges device and resources utilized by the edge device in executing the software applications during run-time. A new software application deployed on an edge device having incompatible hardware and resource constraint may encounter performance issues (e.g., device uptime) during execution of the software application in real-time. Also, this may lead to erroneous analysis of the plant data.

U.S. Patent Application Publication No. 2016/0232366A1 discloses a verification system capable of simulating performance of a real-time device in a given scenario. The verification system receives information on specific scenarios which loaded into a virtual simulator for simulating capabilities of device of interest, runs a suite of simulation events by the virtual simulator, and determines whether the performance of the device meets the target performance. The verification system deploys a device configuration profile to the real-time device if the performance of the device meets the target performance. However, the verification system does not solve the problems described above.

SUMMARY AND DESCRIPTION

The scope of the present disclosure is defined solely by the appended claims and is not affected to any degree by the statements within this summary. The present embodiments may obviate one or more of the drawbacks or limitations in the related art.

In light of the above, there exists a need for an improved method and system for provisioning software applications on edge devices in an IoT environment.

Therefore, it is an object of the present disclosure to provide a method and system for provisioning software applications on edge devices in an IoT environment.

The object is achieved by a method of provisioning a software application on edge devices in an IoT environment. For example, the software application is an application for performing data analytics on the edge device. Alternatively, the software application may be any other application for performing a function on the edge device. The software application may be new application or upgrade patch. The method includes generating a plurality of simulation instances capable of simulating behavior of the software application on one or more edge devices in the IoT environment. Each simulation instance is configured with a unique resource configuration. The method includes processing the software application on each simulation instance using data from an industrial plant and computing an optimum resource configuration associated with the software application based on processing of the software application on the simulation instances. The optimal resource configuration associated with the software application may be computed by determining at least one simulation instance from the plurality of simulation instances on which the behavior of the software application is satisfactory, and determining the unique resource configuration associated with the determined simulation instance, wherein the unique resource configuration is the optimum resource configuration. The optimum resource configuration indicates least resources required for executing the software application on the one or more edge devices. Accordingly, the software application is provisioned on at least one edge device based optimum resource configuration.

In an embodiment, the method may include storing the optimum resource configuration in a metafile associated with the software application in an application repository.

In another embodiment, the method may include evaluating real-time resource capabilities of least one edge device in the IoT environment to execute the software application based on the optimum resource configuration associated with the software application. For example, the real-time resource capabilities indicate real-time resources available on the edge device for executing the software application. The real-time resource may include hardware as well as software resources. The real-time resources may include hardware capabilities and unutilized resources on the edge device. The method may include provisioning the software application on the edge device based on evaluation of the real-time resource capabilities of the edge device.

In yet another embodiment, the method may include selecting a set of unique resource configurations from a plurality of unique resource configurations, wherein the set of unique resource configurations correspond to real-time resource capabilities of the edge devices in the IoT environment. The method may include generating the plurality of the simulation instances based on the selected set of unique resource configurations. Each unique resource configuration includes resource constraints influencing the behavior of the software application.

In still another embodiment, the method may include simulating the software application on each simulation instance using the data from the industrial plant based on the unique resource configuration of each simulation instance. The method may include capturing parameter values indicative of the behavior of the software application during simulation of the software application on each simulation instance. Advantageously, performance of the software application on the edge devices with different resource configurations may be determined prior to provisioning the software application on the edge devices.

In further another embodiment, the method may include determining at least one simulation instance from the plurality of simulation instances on which the optimum behavior of the software application based on the captured parameters values. The method may also include determining the unique resource configuration associated with the determined simulation instance, where the unique resource configuration is the optimum resource configuration.

The object of the present disclosure is also achieved by a system for provisioning software applications on edge devices in an IoT environment. In an exemplary embodiment, the system may be an IoT cloud platform in a cloud infrastructure communicatively connected to edge devices in a plant. In another exemplary implementation, the system may be a remote server(s) communicatively coupled to the edge devices in the plant. The system includes one or more processors, a memory, coupled to the processors, which includes an application repository capable of storing a plurality of software applications. The system also includes a simulation module configured for generating a plurality of simulation instances capable of simulating behavior of the software application on one or more edge devices in the IoT environment. Each simulation instance is configured with a unique resource configuration. The simulation module is configured for processing the software application on each simulation instance using data from an industrial plant, and computing an optimum resource configuration associated with the software application on the one or more edge devices based on processing of the software application on the simulation instances. The simulation module is configured to compute the optimum resource configuration associated with the software application by determining at least one simulation instance from the plurality of simulation instances on which the behavior of the software application is satisfactory, and determining the unique resource configuration associated with the determined simulation instance, wherein the unique resource configuration (404B) is the optimum resource configuration. The optimum resource configuration indicates least resources required for executing the software application on the one or more edge devices. Accordingly, the software application is provisioned on at least one edge device based on the optimum resource configuration.

In an embodiment, the system may include an edge device management module configured for evaluating real-time resource capabilities of least one edge device in the IoT environment to execute the software application based on the optimum resource configuration associated with the software application. In the embodiment, the system may a provisioning module configured for provisioning the software application on the edge device based on evaluation of the real-time resource capabilities of the edge device.

In another embodiment, the simulation module may be configured for storing the optimum resource configuration in a metafile associated with the software application in the application repository.

In yet another embodiment, the simulation module may be configured for selecting a set of unique resource configurations from a plurality of unique resource configurations. The set of unique resource configurations correspond to real-time resource capabilities of the edge devices in the IoT environment. Each unique resource configuration includes resource constraints influencing the behavior of the software application. The simulation module may be configured for generating the plurality of the simulation instances based on the selected set of unique resource configurations.

In still another embodiment, the simulation module may be configured for simulating the software application on each simulation instance using the data from the industrial plant based on the unique resource configuration of each simulation instance. The simulation module may be also configured for capturing parameter values indicative of the behavior of the software application during simulation of the software application on each simulation instance.

In further another embodiment, the simulation module may be configured for determining at least one simulation instance from the plurality of simulation instances on which the behavior of the software application is found as satisfactory based on the captured parameters values. Furthermore, the simulation module may be configured for determining the unique resource configuration associated with the determined simulation instance, where the unique resource configuration is the optimum resource configuration.

Also, the object of the present disclosure is achieved by a computer-program product, having machine-readable instructions stored therein, that when executed by a processor, cause the processor to perform method acts described above. The processor may be a processor of an IoT cloud platform.

BRIEF DESCRIPTION OF THE DRAWINGS

The above-mentioned and other features will now be addressed with reference to the accompanying drawings of the present disclosure. The illustrated embodiments are intended to illustrate, but not limit the disclosure.

The present disclosure is further described hereinafter with reference to illustrated embodiments shown in the accompanying drawings, in which.

DETAILED DESCRIPTION

Figure 1:
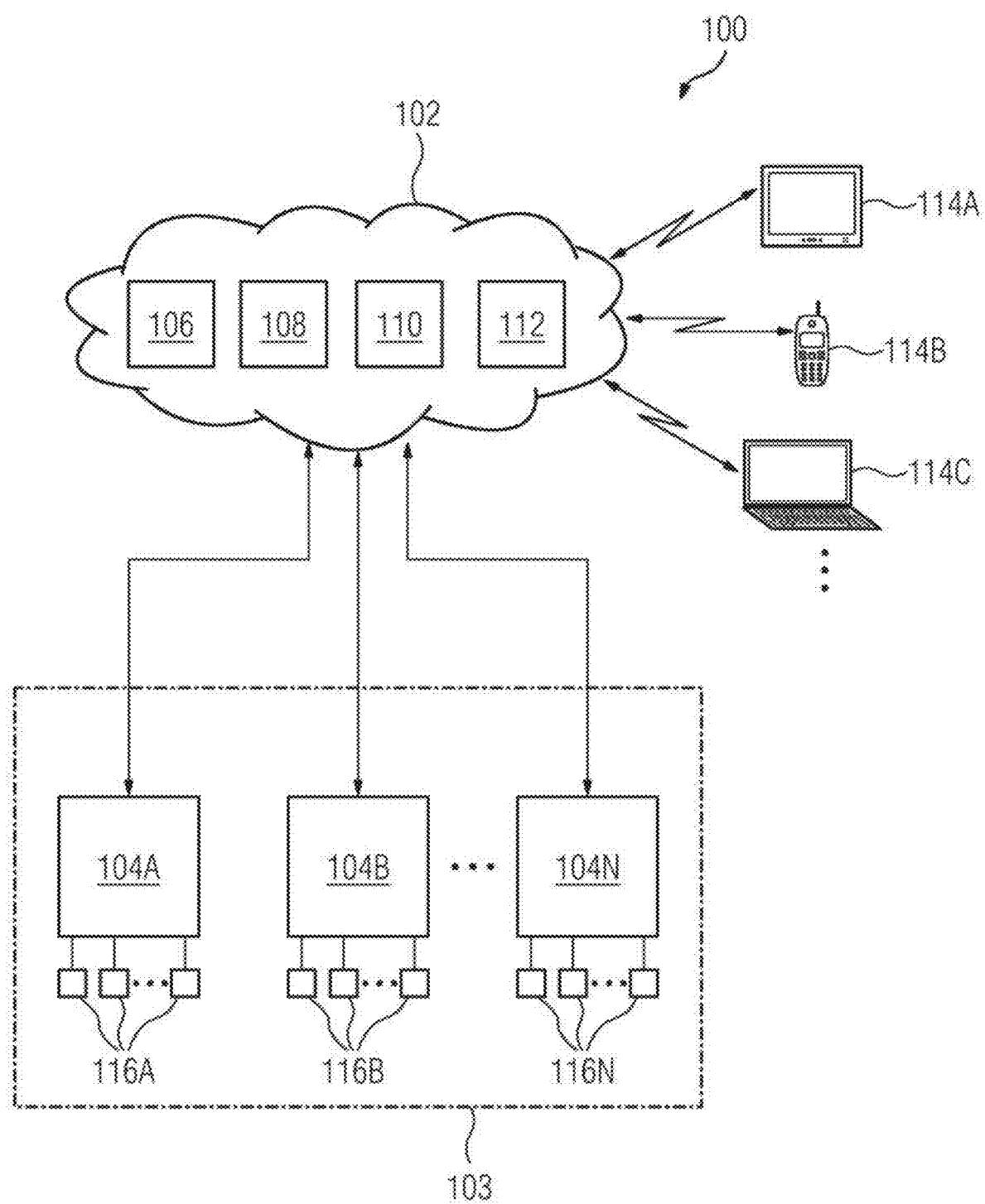
FIG. 1 depicts a schematic representation of an Internet-of-Things (IoT) environment, according to an embodiment.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of an Internet-of-Things (IoT) environment 100, according to an embodiment of. The IoT environment 100 includes an IoT cloud platform 102, a plant 103 including edge devices 104A-N and groups of sensors/actuators 116A-N, and user devices 114A-C. Each group of sensors/actuators 116A-N is connected to respective edge devices 104A-N via wired network or wireless network. Each of the edge devices 104A-N is connected to the IoT cloud platform 102 via a network connection such as wide area network. Also, the user devices 114A-C are connected to the IoT cloud platform 102 via the wide area network.

Although not shown, some or all of the edge devices 104A-N may be connected to the IoT cloud platform 102 via an edge gateway. Also, the IoT cloud platform 102 may be connected to edge devices in plants 103 located in different geographical locations.

In the plant 103, the groups of sensors/actuators 116A-N are deployed for monitoring and controlling equipment and processes. An example of a sensor may be an infra-red camera deployed in the plant 103. The edge devices 104A-N may be battery-powered devices and equipped with an edge operating system. For example, the edge devices 104A-N are configured for collecting plant data from the respective groups of sensors 116A-N, and analyzing the collected plant data using a set of software applications deployed on the edge devices 104A-N. The edge devices 104A-N may send commands to the respective actuators based on outcome of analysis of the collected plant data. The edge devices 104A-N may also push the raw/processed plant data and/or results of analysis of the plant data to the IoT cloud platform 102.

The IoT cloud platform 102 may be a cloud infrastructure capable of providing cloud-based services such as provisioning of software applications on the edge devices 104A-N. The IoT cloud platform 102 may be part of public cloud and/or private cloud. The IoT cloud platform 102 may enable data scientists/software vendors to provide a software application as a service, thereby eliminating need for software maintenance, upgrading, and backup by the users. The software application may be complete application, or software patch. In some embodiments, the software application may be an analytical application for performing data analytics on the edge devices 104A-N. For example, the software application may include an application for downsampling of time series data, filtering time series data based on thresholds or moving averages, performing Fast-Fourier transform on vibration data and filtering frequencies which indicate anomaly, performing liner regression and trend prediction, local classification using support vector machine classifiers, neural network or deep learning classifiers, performing stream analytics, etc.

Figure 2:
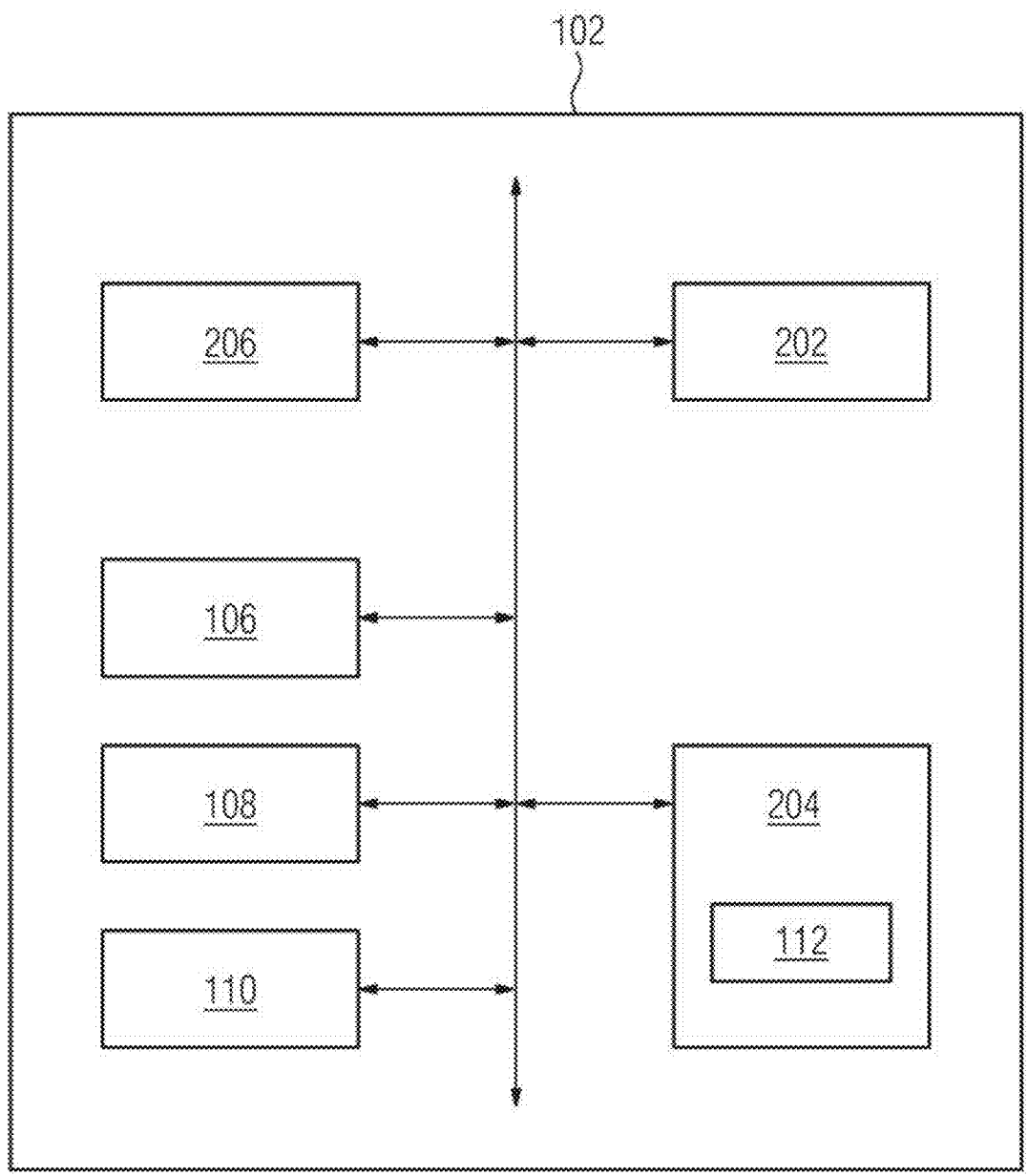
FIG. 2 depicts a block diagram of an IoT cloud platform as shown in FIG. 1, according to an embodiment.

The IoT cloud platform 102 is further illustrated in greater detail in FIG. 2. Referring to FIG. 2, the IoT cloud platform 102 includes a simulation module 106, a provisioning module 108, an edge device management module 110, a processor(s) 202, a memory unit 204, and a communication interface 206. The simulation module 106, the provisioning module 108, and the edge device management module 110 may take a form of hardware such as a processor with embedded software, or a computer program in the form machine-readable instructions stored on a computer program product (e.g., the memory unit 204) and executable by the processor(s) 202. The processor(s) 102 may be one or more processing units (e.g., servers). The processor(s) 102 is also capable of executing machine-readable instructions stored on a computer-readable storage medium such as the memory unit 204 for performing various functions such as processing plant data, analyzing plant data, providing visualization of the analyzed plant data, issuing control commands to the actuators, managing the edge devices 104A-N and so on. The memory unit 204 may be volatile or non-volatile memory. In the embodiment, the memory unit 204 is configured to store an application repository 112. The application repository 112 is capable of storing software applications for provisioning on the edge devices 104A-N. The software applications are stored in the application repository 112 as application binaries along with associated optimum resource configuration in a metafile. The communication interface 206 is configured to establish a communication channel between the edge devices 104A-N and the IoT cloud platform 102. Also, the communication interface 206 is configured to establish a communication channel between the IoT cloud platform 102 and the user devices 114A-C.

The simulation module 106 is configured for simulating behavior of a software application on a plurality of simulation instances in a simulation environment. Each simulation instance represents an edge device in the IoT environment 100. Each simulation instance is also configured with a unique resource configuration. The unique resource configuration corresponds to real-time resource capabilities of the edge device. The unique resource configuration includes resource constraints which has an influence on the behavior of the software application. In an exemplary implementation, the simulation module 106 executes the software application on the plurality of simulation instances in series or in parallel for a pre-determined time period. The simulation module 106 is configured for computing an optimum resource configuration associated with the software application based on the outcome of the simulation of the software application. The optimum resource configuration indicates least resources required for executing the software application on the edge devices 104A-N in the IoT environment 100. The simulation module 106 is configured for storing the optimum resource configuration in a metafile associated with the software application in the application repository 112.

The edge device management module 110 is configured for evaluating real-time resource capabilities of the edge devices 104A-N to execute the software application based on the optimum resource configuration associated with the software application. For example, the resources may be hardware as well as software resources. The resource may be network resources, storage resources, computational resources, etc. The optimum resource configuration indicates minimum resources required to execute the software application on the edge devices 104A-N in real-time. The provisioning module 108 is configured for provisioning the software application on one or more edge devices 104A-N if the one or more edge devices 104A-N has sufficient real-time resource capabilities to execute the software application. The acts performed by the IoT cloud platform 102 to simulate software applications and later provision the software applications on the edge devices 104-N are explained in greater detail in following description.

The user devices 114A-C may be cloud-aware device such as laptop, desktop, tablet computer, smart phone and the like devices. The user devices 114A-C are configured for accessing the IoT cloud platform 102 using a cloud user interface via the Internet. In one embodiment, the user devices 114A-C are configured for viewing the raw/processed plant data and/or results of analysis of the plant data via the cloud user interface. In another embodiment, the user devices 114A-C are configured for uploading software applications to be provisioned on the edge devices 104A-N in the application repository 112. For example, the software applications may be created by data scientists or software vendors for targeted use cases and uploaded on the IoT cloud platform 102 for provisioning on the edge devices 104A-N. In yet another embodiment, the user devices 114A-C are configured for requesting computation of optimum resource configuration through simulation of a desired software application and provisioning the software application on one of the edge devices 104A-N in the plant 103 based on the optimum resource configuration. In still another embodiment, the user devices 114A-C may act as a portable human-machine interface device for issuing commands to the actuators 116A-N via the edge devices 104A-N based on the results of the analysis of the plant data.

Figure 3:
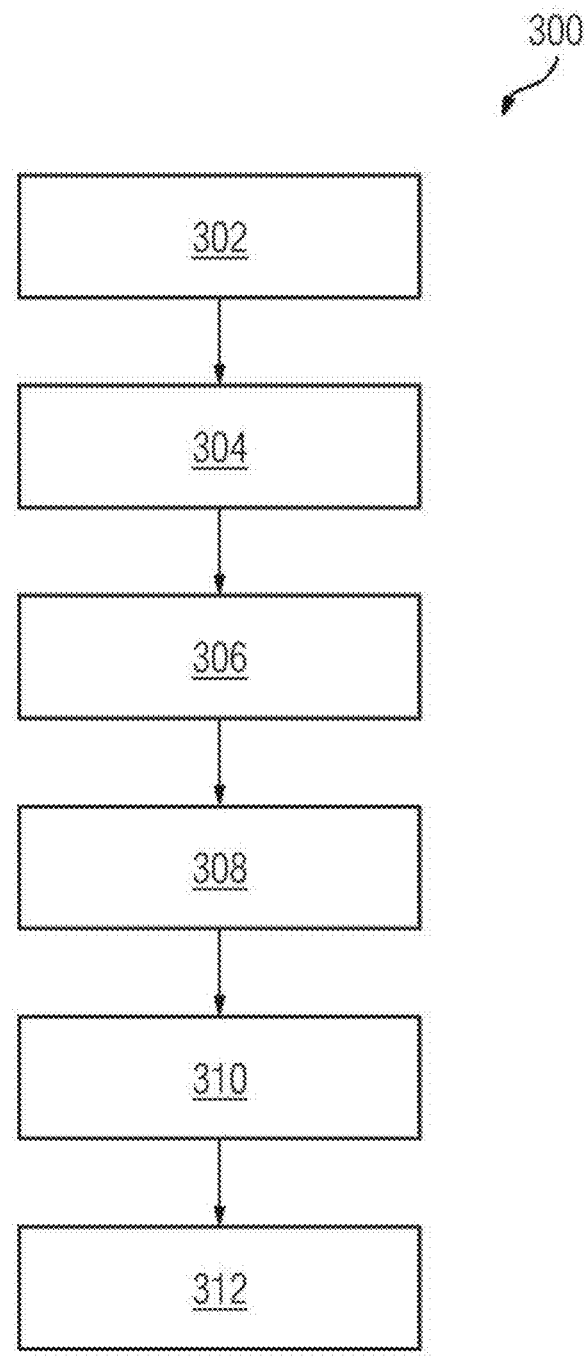
FIG. 3 depicts a flow diagram illustrating an exemplary method of provisioning a software application on an edge device by the IoT cloud platform, according to an embodiment.

FIG. 3 is a process flowchart 300 illustrating an exemplary method of provisioning a software application on the edge device 104A by the IoT cloud platform 102, according to an embodiment. At act 302, a plurality of simulation instances capable of simulating behavior of a software application on the edge devices 104A-N is generated. For example, the software application may be analytical application for analyzing real-time video streams from infra-red cameras deployed in the plant 103 to determine quality of a manufactured product. In the embodiment, a set of unique resource configuration is selected from a plurality of unique resource configurations. The set of unique resource configurations are selected such that resource configurations correspond to real-time resource capabilities of the edge devices 104A-N in the IoT environment 100. Each of the selected unique resource configurations includes resource constraints which has an influence on behavior of the software application during simulation. Exemplary resource constraints may include read-access memory (RAM) size, processor type, storage size, Bus size, etc. In this embodiment, the plurality of simulation instances is generated based on the selected set of unique resource configurations. For example, the simulation instances are configured with corresponding unique resource configurations. The number of simulation instances and associated resource configurations are formulated based on the type of software application to be simulated.

At act 304, the software application is processed on the simulation instances using data from the plant 103. For example, data from the plant 103 may be real-time data or historical data collected from the plant 103. The data for analyzing product quality may include real-time video streams obtained from infra-red cameras. In an embodiment, behavior of the software application is simulated by executing the software application on the simulation instances using the data from the plant 103. In an exemplary implementation, the software application is executed in parallel on the simulation instances for a pre-determined time period. Alternatively, the software application is executed on the simulation instances for the predetermined time period in a pre-defined order. In the embodiment, parameter values indicative of the behavior of the software application during simulation are captured for each simulation instance. For example, the parameter values captured for each simulation instance are key performance indicators which indicate performance of the software application when executed on an edge device with the associated unique resource configuration.

At act 306, an optimum resource configuration associated with the software application is computed based on processing the software application on the simulation instances. In an embodiment, a simulation instance is determined from the plurality of simulation instance based on the captured parameter values. In other words, the simulation instance on which optimum behavior of the software application is determined as best simulation instance.

In this embodiment, the unique resource configuration associated with the simulation instance is determined. This unique resource configuration is considered as the optimum resource configuration for executing the software application. The optimum resource configuration is a resource configuration which resulted in satisfactory performance of the software application when the software application is simulated on the associated simulation instance. The optimum resource configuration indicates least recommended resource configuration that shall be available on an edge device for satisfactory performance of the software application on the edge device. Thus, the optimum resource configuration is the least resource configuration that the edge device possesses for provisioning the software application on the edge device.

At act 308, the optimum resource configuration is stored in a metafile associated with the software application in the application repository 112. At act 310, real-time resource capabilities of at least one edge device 104A to execute the software application are evaluated based on the optimum resource configuration associated with the software application.

In the embodiment, real-time resources available for execution of the software application are obtained from the edge device 104A. Also, the optimum resource configuration indicating minimum resources required for satisfactory performance of the software application when deployed in the edge device 104A is obtained from the metafile associated with the software application. It is determined whether the real-time resources available are greater than or equal to the minimum resources required for provisioning the software application. If the real-time resources available are greater than or equal to the minimum resources required, then at act 312, the software application is provisioned on the edge device 104A. The software application is then installed and executed in runtime on the edge device 104A using the real-time resources available on the edge device 104A.

If the real-time resources available are less than the minimum resources required, then the edge device 104A may free-up resources by uninstalling undesired software applications. Alternatively, the IoT cloud platform 102 may customize the software application in such a manner that the optimum resource configuration associated with the software application is less than or equal to the real-time resources available on the edge device 104A.

Figure 4:
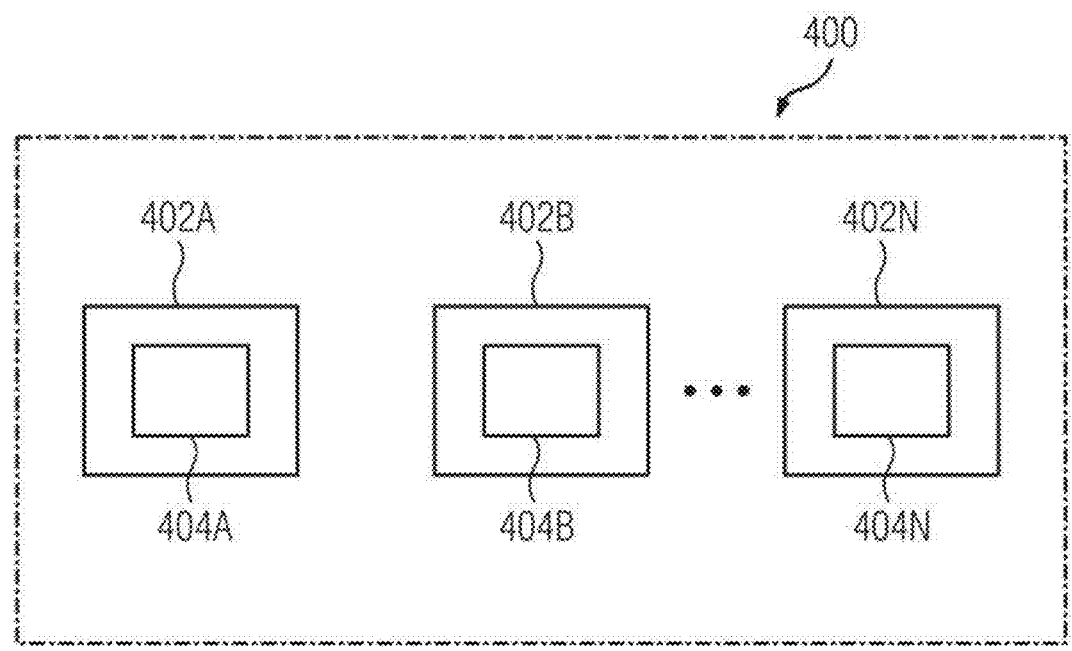
FIG. 4 illustrates a schematic representation of a simulation environment for computing optimum resource configuration for deploying the software application on the edge device, according to an embodiment.

FIG. 4 illustrates a schematic representation of a simulation environment 400 for computing an optimum resource configuration for deploying a software application on the edge devices 104A-N, according to an embodiment.

Consider that an analytical application is developed for analyzing real-time video streams of a product obtained from infra-red cameras in the plant 103 and identifying deviations in product quality in real-time. The analytical application may be implemented as a 3 layered Convolutional Neural Network (CNN) model with about hundred nodes in each layer. The CNN model is created by data scientists using training video data. The analytical application is designed for deploying on one or more edge devices 104A-N in the plant 103 which interfaces with the infra-red cameras to obtain infra-red video streams of a manufactured product and computes deviations in quality of the product. Prior to deploying the analytical application, it is not clear as whether the analytical application may run smoothly without any performance issues if deployed on an edge device 104A. Therefore, the present disclosure simulates the behavior of the analytical application in the simulation environment 400 and computes an optimum resource configuration for the analytical application required for deploying on the edge device 104A as described below.

According to the embodiment, the analytical application is added as a cloud container (e.g., Docker™ Hub) in the application registry 112 for provisioning on one or more edge devices 104A-N. The simulation module 106 prepares the simulation environment 400 including simulation instances 402A-N for simulating the behavior of the analytical application. For the purpose of illustration, consider that the simulation environment 400 includes a simulation instance 402A, a simulation instance 402B, and a simulation instance 402C.

The simulation module 106 configures the simulation instance 402A with a unique resource configuration 404A. The unique resource configuration 404A includes resource constraints: 64 MB RAM, 512 MHz with single core processor, 512 MB storage, and 128 MHz internal communication bus. Similarly, the simulation module 106 configures the simulation instance 402B with a unique resource configuration 404B. The unique resource configuration 402B includes resource constraints: 512 MB RAM, 1 GHz with dual-core processor, 2 GB storage, 1 GHz internal communication bus, and 512 MB Graphical Processing Unit (GPU). Also, the simulation module 106 configures the simulation instance 402C with a unique resource configuration 404C. The unique resource configuration 404C includes resource constraints: 2 GB RAM, 2 GHz with eight cores processor, 4 GB Solid State Drive, 2 GHz internal communication bus, 2 GB GPU and a tensor processing unit. The resource configuration 404A of the simulation instance 402A may be an embedded device with low resource capabilities. On the contrary, the simulation instance 402C has the unique resource configuration 404C as that of a powerful edge device with built-in GPU and Tensor Processing unit and high resource capabilities.

The simulation module 106 obtains the cloud container of the analytical application from the application repository 112 and deploys the cloud container of the analytical application simultaneously on the simulation instances 402A-C. The simulation instances 402A-C executes the analytical application according to the respective unique resource configuration for a specific time period (e.g., 48 hours) using infra-red video stream data. In an exemplary implementation, the simulation instances 402A-C may have Docker™ runtime to run the cloud container of the analytical application. The cloud container may also contain the infra-red video stream data. During this time period, the simulation module 106 monitors the behavior of the analytical application being simulated on the simulation instances 402A-C. The simulation module 106 computes parameter values indicative of the behavior of the analytical application on each of the simulation instances 402A-C. The parameter values may indicate accuracy of output of the analytical application, average/peak load on the processor, average/peak read and writes, average/peak utilization of GPU/Tensor Processing Unit, and so on.

The simulation module 106 checks whether the parameter values associated with each of the simulation instances are within a pre-determined threshold level. For example, if the parameter value indicates that average utilization of the processor is 90% on a particular simulation instance (e.g., the simulation instance 402A) whereas the predetermined threshold for utilization of processor is 75%. In such case, the behavior or performance of the analytical application on the specific simulation instance (e.g., the simulation instance 402A) is said to be non-satisfactory or unacceptable. This may lead to performance issues when the analytical application is run on the edge device having such configuration as that of the specific simulation instance. In the current example, the analytics application is computation expensive and hence the performance of the analytical application is non-satisfactory on the simulation instance 402A with low resource configuration 404A.

Based on the parameter values, the simulation module 106 identifies one or more simulation instances from the simulation instances 402A-C on which the behavior of the analytical application is found to be satisfactory. In other words, the parameter values computed for the simulation instances are within the predetermined threshold level. Consider that, the simulation module 106 identifies the simulation instances 402B and 402C on which the behavior of the analytical application is satisfactory.

The simulation module 106 determines a simulation instance which has lowest unique resource configuration among the simulation instances 402B and 402C. In the current case, the simulation module 402 identifies the unique resource configuration 404B associated with the simulation instance 402B as an optimum resource configuration for deploying the analytical application on the edge devices 104A-N. The optimum resource configuration is a least recommended resource configuration that an edge device shall have for being eligible to deploy the analytical application. The simulation module 106 stores the optimum resource configuration in a metafile associated with the analytical application in the application repository 112.

When a request for provisioning the analytical application on an edge device 104A is received, the edge device management module 110 obtains real-time resource availability information from the edge device 104A. The edge device management module 110 evaluates real-time resource capabilities of the edge device 104A to execute the analytical application in real-time based on the real-time resource availability information and the optimum resource configuration. If the edge device 104A has the optimum resource configuration, then the provisioning module 108 provisions the analytical application to the edge device 104A. This helps ensure that the performance of the analytical application when executed on the edge device 104A would be satisfactory.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

The invention claimed is:

1. A method of provisioning a software application on edge devices in an Internet-of-Things (IoT) environment, the method comprising:
   generating, by a processor, a plurality of simulation instances capable of simulating behavior of the software application on one or more edge devices in the IoT environment, wherein each simulation instance of the plurality of simulation instances is configured with a unique resource configuration;
   processing the software application on each simulation instance of the plurality of simulation instances using data from a plant; and
   computing an optimum resource configuration associated with the software application based on processing of the software application on the plurality of simulation instances, wherein the computing of the optimum resource configuration comprises:
      determining at least one simulation instance from the plurality of simulation instances on which the behavior of the software application is satisfactory; and
      determining the unique resource configuration associated with the determined simulation instance, wherein the unique resource configuration is the optimum resource configuration which indicates least resources required for executing the software application on the one or more edge devices.

2. The method of claim 1, further comprising:
   storing the optimum resource configuration in a metafile associated with the software application in an application repository.

3. The method of claim 1, wherein the generating of the plurality of simulation instances comprises:
   selecting a set of unique resource configurations from a plurality of unique resource configurations, wherein the set of unique resource configurations corresponds to real-time resource capabilities of the one or more edge devices in the IoT environment; and
   generating the plurality of the simulation instances based on the selected set of unique resource configurations.

4. The method of claim 3, wherein each unique resource configuration of the set of unique resource configurations comprises resource constraints influencing the behavior of the software application.

5. The method of claim 1, wherein the processing of the software application comprises:
   simulating the behavior of the software application on each simulation instance of the plurality of simulation instances using the data from the plant based on the unique resource configuration of each simulation instance; and
   capturing parameter values indicative of the behavior of the software application during simulation of the software application on each simulation instance.

6. The method of claim 5, wherein the computing of the optimum resource configuration comprises:
   determining at least one simulation instance from the plurality of simulation instances on which the behavior of the software application is satisfactory based on the captured parameter values; and
   determining the unique resource configuration associated with the determined simulation instance, wherein the determined unique resource configuration is the optimum resource configuration.

7. The method according to claim 1, further comprising:
   evaluating real-time resource capabilities of at least one edge device in the IoT environment to execute the software application based on the optimum resource configuration associated with the software application; and
   provisioning the software application on the at least one edge device based on evaluation of the real-time resource capabilities of the at least one edge device.

8. A system for provisioning software applications on edge devices in an Internet-of-Things (IoT) environment, the system comprising:
   one or more processors;
   a memory unit coupled to the one or more processors, wherein the memory unit comprises an application repository capable of storing a plurality of software applications;
   a simulation module configured to:
      generate a plurality of simulation instances capable of simulating behavior of the software application on one or more edge devices in the IoT environment, wherein each simulation instance of the plurality of simulation instances is configured with a unique resource configuration;
      process the software application on each simulation instance of the plurality of simulation instances using data from a plant; and
      compute an optimum resource configuration associated with the software application based on processing of the software application on the plurality of simulation instances,
   wherein the simulation module is configured to compute the optimum resource configuration associated with the software application by:
      a determination of at least one simulation instance from the plurality of simulation instances on which the behavior of the software application is satisfactory; and
      a determination of the unique resource configuration associated with the determined simulation instance, wherein the unique resource configuration is the optimum resource configuration which indicates least resources required for executing the software application on the one or more edge devices.

9. The system of claim 8, wherein the simulation module is configured to:
store the optimum resource configuration in a metafile associated with the software application in the application repository.

10. The system of claim 8, wherein the simulation module is configured to:
select a set of unique resource configurations from a plurality of unique resource configurations, wherein the set of unique resource configurations correspond to real-time resource capabilities of the edge devices in the IoT environment, and wherein each unique resource configuration of the set of unique resource configurations comprises resource constraints configured to influence the behavior of the software application; and
generate the plurality of the simulation instances based on the selected set of unique resource configurations.

11. The system of claim 8, wherein the simulation module is configured to:
simulate the behavior of the software application on each simulation instance of the plurality of simulation instances using the data from the plant based on the unique resource configuration of each simulation instance; and
capture parameter values indicative of the behavior of the software application during simulation of the software application on each simulation instance.

12. The system of claim 11, wherein the simulation module is configured to:
determine at least one simulation instance from the plurality of simulation instances on which the behavior of the software application is found as satisfactory based on the captured parameter values; and
determine the unique resource configuration associated with the determined simulation instance, wherein the unique resource configuration is the optimum resource configuration.

13. The system of claim 8, further comprising:
an edge device management module configured to evaluate real-time resource capabilities of at least one edge device in the IoT environment to execute the software application based on the optimum resource configuration associated with the software application.

14. The system of claim 13, further comprising:
provisioning the software application on the at least one edge device based on evaluation of the real-time resource capabilities of the at least one edge device.

15. A non-transitory computer-readable medium, having computer readable instructions stored therein, that when executed by a processor, cause the processor to:
generate a plurality of simulation instances capable of simulating behavior of a software application on one or more edge devices in an Internet-of-Things (IoT) environment, wherein each simulation instance of the plurality of simulation instances is configured with a unique resource configuration;
process the software application on each simulation instance of the plurality of simulation instances using data from a plant; and
compute an optimum resource configuration associated with the software application based on processing of the software application on the plurality of simulation instances, wherein the computing of the optimum resource configuration comprises:
a determination of at least one simulation instance from the plurality of simulation instances on which the behavior of the software application is satisfactory; and
a determination of the unique resource configuration associated with the determined simulation instance, wherein the unique resource configuration is the optimum resource configuration which indicates least resources required for executing the software application on the one or more edge devices.

* * * * *